US008638073B2

(12) United States Patent
Nishimura et al.

(10) Patent No.: US 8,638,073 B2
(45) Date of Patent: Jan. 28, 2014

(54) CONTROL DEVICE FOR VEHICLE AC GENERATOR

(75) Inventors: Shinji Nishimura, Tokyo (JP); Noriyuki Wada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 654 days.

(21) Appl. No.: 12/854,620

(22) Filed: Aug. 11, 2010

(65) Prior Publication Data

US 2011/0260696 A1 Oct. 27, 2011

(30) Foreign Application Priority Data

Apr. 22, 2010 (JP) ................................. 2010-098767

(51) Int. Cl.
*H02P 9/00* (2006.01)
(52) U.S. Cl.
USPC ............................................................ 322/28
(58) Field of Classification Search
USPC .................................. 322/28, 24, 20, 44, 22
See application file for complete search history.

(56) References Cited

U.S. PATENT DOCUMENTS

| 4,788,452 | A | * | 11/1988 | Stanley | 307/71 |
|---|---|---|---|---|---|
| 6,700,353 | B2 | * | 3/2004 | Asada | 322/28 |
| 7,235,952 | B2 | * | 6/2007 | Maehara | 322/24 |
| 7,602,152 | B2 | * | 10/2009 | Oshima et al. | 322/33 |
| 7,965,063 | B2 | * | 6/2011 | Hashimoto et al. | 322/37 |
| 2005/0140342 | A1 | * | 6/2005 | Maehara et al. | 322/36 |
| 2006/0197346 | A1 | * | 9/2006 | Maehara | 290/40 B |
| 2006/0238172 | A1 | * | 10/2006 | Maehara et al. | 322/33 |
| 2007/0085512 | A1 | * | 4/2007 | Maehara | 322/28 |
| 2007/0114976 | A1 | * | 5/2007 | Inokuchi et al. | 322/28 |
| 2007/0247119 | A1 | * | 10/2007 | Maehara | 322/28 |
| 2008/0186000 | A1 | * | 8/2008 | Kimura et al. | 322/23 |
| 2008/0224671 | A1 | * | 9/2008 | Kimura et al. | 322/19 |
| 2009/0039838 | A1 | * | 2/2009 | Maehara | 322/19 |
| 2009/0058372 | A1 | * | 3/2009 | Tsuzuki | 322/18 |
| 2009/0058373 | A1 | * | 3/2009 | Graovac et al. | 322/25 |
| 2009/0224600 | A1 | * | 9/2009 | Kizawa et al. | 307/9.1 |
| 2009/0230764 | A1 | * | 9/2009 | Konishi | 307/9.1 |
| 2011/0260696 | A1 | * | 10/2011 | Nishimura et al. | 322/28 |
| 2011/0260697 | A1 | * | 10/2011 | Nishimura et al. | 322/28 |

FOREIGN PATENT DOCUMENTS

JP 03-045200 A 2/1991

* cited by examiner

*Primary Examiner* — Tulsidas C Patel
*Assistant Examiner* — Viet Nguyen
(74) *Attorney, Agent, or Firm* — Sughrue Mion, PLLC (57) ABSTRACT

A control device for a vehicle AC generator which restricts an upper limit of a field current to the maximum field current at a set voltage even when a power generation voltage becomes large, is obtained. In the control device for the vehicle AC generator, in which a DC voltage obtained by rectifying an AC output voltage of an armature coil in the AC generator with a rectifier is applied to a field coil to obtain a field current and the field current is controlled by ON/OFF of a switching element connected in series to the field coil, an upper limit restriction unit in which an upper limit of on-duty of the switching element is set to a set voltage/the DC voltage, is included.

11 Claims, 7 Drawing Sheets

CONTROL DEVICE FOR VEHICLE AC GENERATOR

BACKGROUND OF THE INVENTION

1. Field of the Invention

The present invention relates to a control device for a vehicle AC (alternating current) generator and, more particularly, relates to one which restricts an upper limit of a field current flowing through a field coil.

2. Description of the Related Art

In a known control device for a vehicle AC generator (Japanese Unexamined Patent Publication No. H3-45200), a resistor is connected in series to a field coil and a value of a field current flowing through the field coil is detected by a voltage across the resistor. Then, when the field current exceeds a predetermined value, the field current is cut off.

However, in a method in which a resistor is connected in series to a field coil for detecting a voltage across the resistor and a field current value is detected, if a resistance value of the resistor is large, loss at the resistor becomes large and a sufficient voltage cannot be applied to the field coil because of a voltage drop due to the resistor; and therefore, a resistor having a very small resistance value is used. But, it is difficult to secure accuracy of the very small resistance value and the resistance value is small; and thus a detected voltage is minute. In order to detect the current with high accuracy from the minute voltage, a detection circuit needs to have accuracy and a current sensor needs to have high accuracy, thereby becoming expensive.

Furthermore, if a field current is not restricted, an excessive current flows through a field coil when a power generation voltage of a self-excited AC generator becomes high; and consequently, it is likely to lead to burnout of the field coil or to burnout of the AC generator because a power generation output becomes excessive.

SUMMARY OF THE INVENTION

The present invention has been made to solve the foregoing problem, and an object of the present invention is to restrict an upper limit of a field current to the maximum field current at a set voltage even when a power generation voltage becomes large.

According to the present invention, there is provided a control device for a vehicle AC generator, in which a DC (direct current) voltage obtained by rectifying an AC output voltage of a armature coil in the AC generator that has the armature coil and a field coil with a rectifier is applied to the field coil to obtain a field current, and the field current is controlled by ON/OFF of a switching element connected in series to the field coil. In the control device for the vehicle AC generator, an upper limit restriction unit in which an upper limit of on-duty of the switching element is set to a set voltage/the DC voltage is included.

According to the control device for the vehicle AC generator of the present invention, the upper limit of the field current can be restricted to the maximum field current at the set voltage even when a power generation voltage becomes large.

Furthermore, according to the present invention, there is provided a control device for a vehicle AC generator, in which on-duty of a switching element by a power generation command is compared to on-duty of the switching element by an upper limit restriction unit, and ON/OFF control of the switching element is performed by smaller on-duty thereof.

Furthermore, according to the control device for the vehicle AC generator of the present invention, the on-duty by the power generation command is compared to the on-duty by the upper limit restriction unit and ON/OFF control of the switching element is performed by smaller on-duty thereof, whereby even when an unreasonable power generation command is received, safe control can be achieved by a comparison with the on-duty by the upper limit restriction unit; and thus, overheat and overvoltage of the generator can be prevented.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
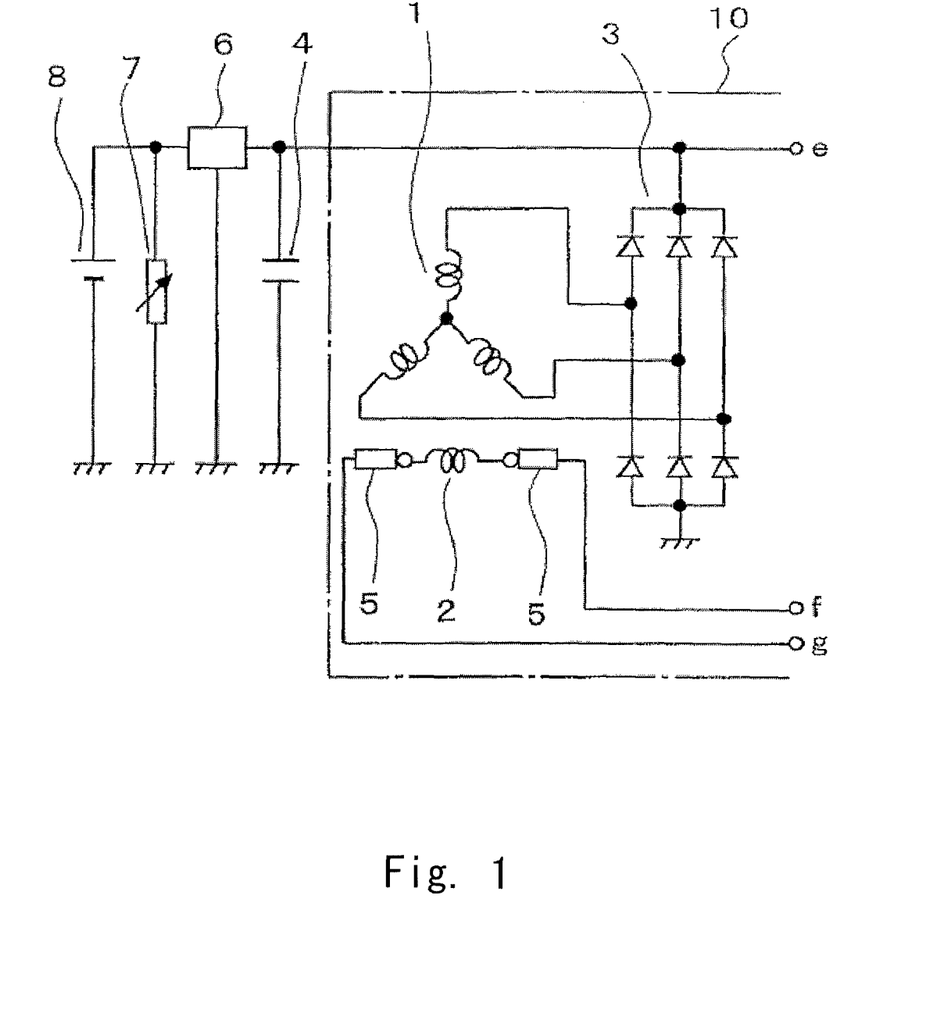
FIG. 1 is a configuration diagram showing a vehicle AC generator to which Embodiment 1 of the present invention is applied.
Figure 2:
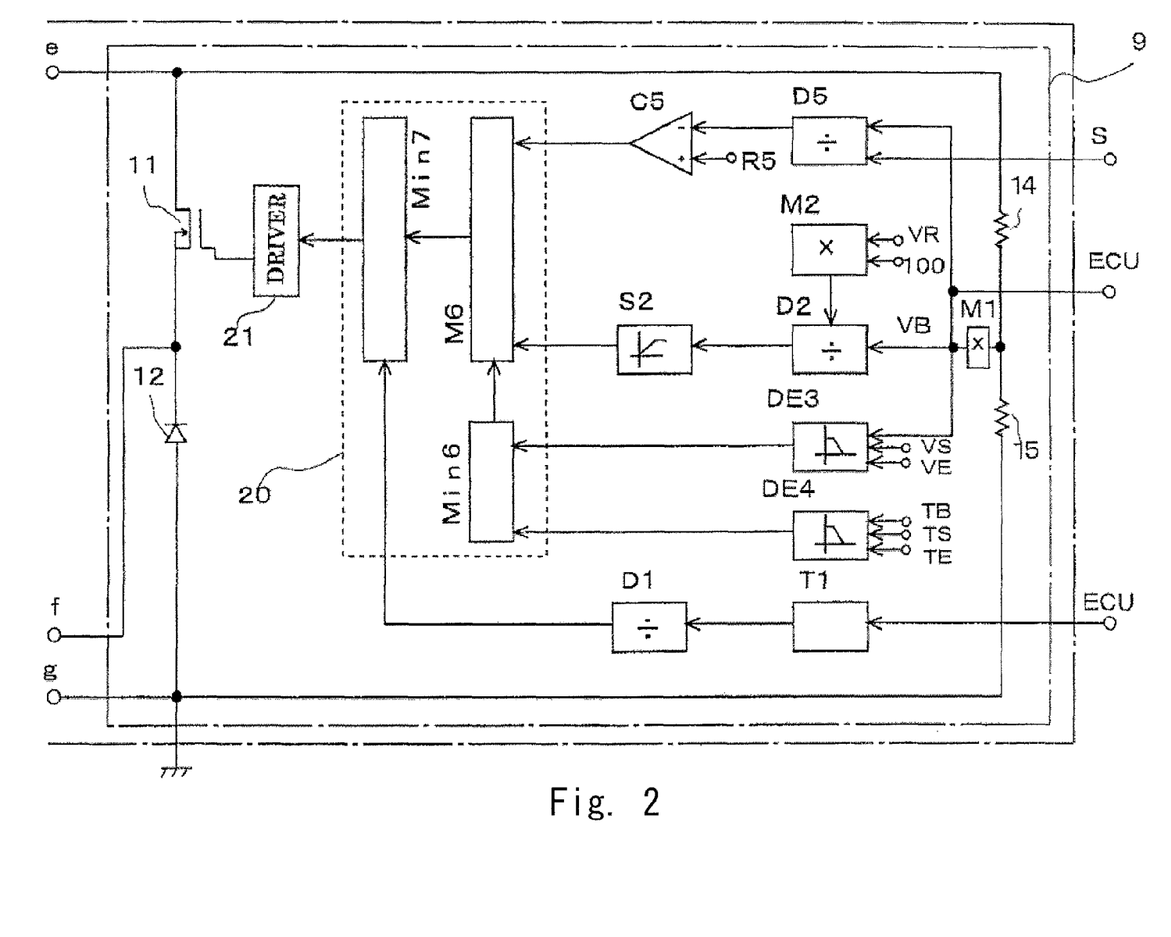
FIG. 2 is a block diagram showing the control device for the vehicle AC generator of Embodiment 1.

FIG. 1 is a configuration diagram showing a vehicle AC generator to which Embodiment 1 of the present invention is applied. FIG. 2 is a block diagram showing a control device 9 for the vehicle AC generator of Embodiment 1 and terminals e, f, and g shown in FIG. 1 are connected to terminals e, f, and g shown in FIG. 2; accordingly, the whole of a vehicle AC generator system 10 is shown. In FIG. 1, when an internal combustion engine (not shown in the drawing) is started up, a rotor (having a field coil 2) of the AC generator (hereinafter, referred to as "generator") is driven via a belt (not shown in the drawing). The field coil 2 is connected to the terminals f and g via slip rings and brushes 5. With the driving of the rotor, an AC output voltage generated by a three phase armature coil 1 (on the stator side) is rectified by a three phase full wave rectifier 3. The generator is composed of the armature coil 1, the field coil 2, and the rectifier 3.

A DC voltage (DC output voltage) rectified by the rectifier 3 is charged to an electric double layer capacitor 4 connected to the rectifier 3. A terminal voltage of the electric double layer capacitor 4 rises by being charged. The electric double layer capacitor 4 is connected to a voltage converter (DC/DC converter) 6 by which voltage of the electric double layer capacitor 4 is converted to 14V to charge a battery 8, and a power of 14 V is supplied to an electric load 7 of other vehicle.

In FIG. 2, reference numeral 11 denotes a switching element, such as a power semiconductor switching element configured by a MOSFET (metal oxide semiconductor field effect transistor). The switching element 11 is connected in series to the field coil 2. A DC voltage or the DC voltage of the electric double layer capacitor 4 is applied to a series body of the switching element 11 and the field coil 2, and a field current of the field coil 2 is controlled by performing ON/OFF control of the switching element 11. Reference numeral 12 denotes a reflux diode; and when the switching element 11 is turned off, the field current by residual energy in the field coil 2 is refluxed through the reflux diode 12. The DC voltage of the rectifier 3 of the generator or the DC voltage of the electric double layer capacitor 4 is applied to a resistor 14 and a resistor 15, and a divided voltage thereof VB/α is led out from a node of the resistor 14 and the resistor 15. In this regard, however, VB is the DC voltage of the rectifier 3 or the DC voltage of the electric double layer capacitor 4, and α is a voltage division ratio. The divided voltage VB/α is multiplied by α with a multiplier M1 and the DC voltage VB is outputted. The DC voltage VB is also outputted to the outside (ECU).

Hereinafter, block configurations and operation of the ON/OFF control of the switching element 11 in FIG. 2 will be described. A power generation command from an ECU (engine control unit) is inputted as one that specifies on-duty of the switching element 11 (duty factor at which the switching element 11 is turned on).

Figure 3:
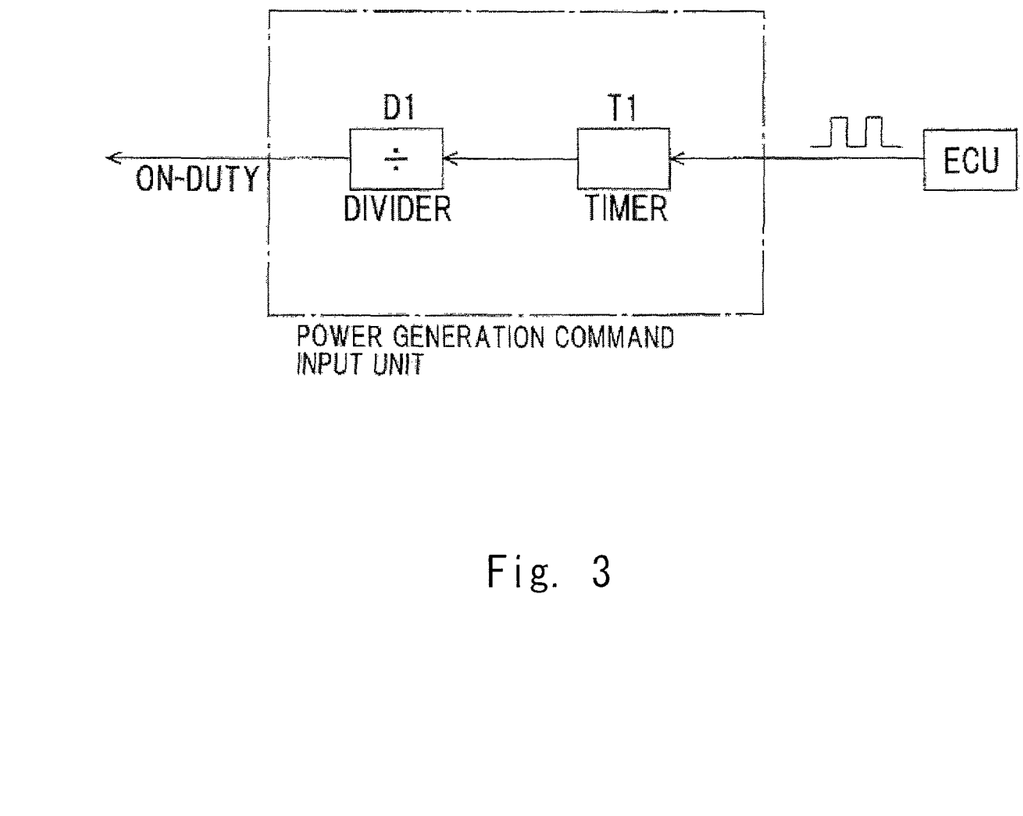
FIG. 3 is a diagram for explaining a block configuration of a power generation command input unit in Embodiment 1.

FIG. 3 is a diagram for explaining a block configuration of a power generation command input unit in Embodiment 1. A pulse train serving as the power generation command is inputted from the ECU to a Timer T1. An ON time and a cycle of the inputted pulse train (PWM signal) are found by the Timer T1, this output is inputted to a divider D1, and the on-duty of the switching element 11 based on the power generation command is outputted. Incidentally, as the power generation command from the ECU, those which directly output the on-duty of the switching element 11, such as a PWM signal, an analog signal, or a digital signal may be permissible. Then, the on-duty of the switching element 11 from the divider D1 or the ECU is inputted to a minimum value selector Min7 of an integrated selector 20. In addition, operation of the integrated selector 20 will be described later.

When the on-duty of the switching element 11 based on the power generation command is selected as the output of the minimum value selector Min7, the on-duty is outputted from a drive circuit (driver) 21 and ON/OFF control (PWM control) of the switching element 11 is performed by the on-duty. Then, a field current is supplied from the electric double layer capacitor 4, the generator starts power generation, and a DC voltage rectified by the rectifier 3 is charged to the electric double layer capacitor 4. When the electric double layer capacitor 4 is charged, voltage rises; and therefore, when the on-duty is a constant value, an average voltage to be applied to the field coil 2 rises and the field current increases. When the voltage rises, the power generation command from the ECU reduces the on-duty of the switching element 11 so as to restrict the DC voltage.

Figure 4:
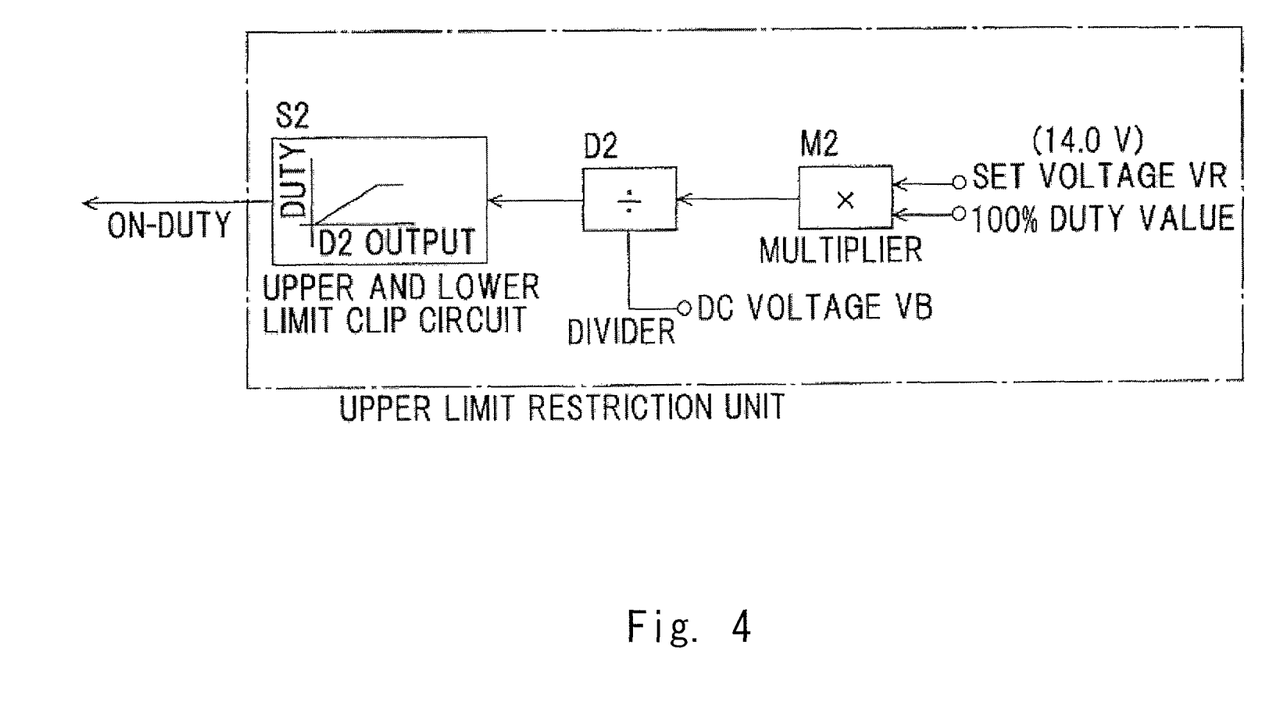
FIG. 4 is a diagram for explaining a block configuration of an upper limit restriction unit which restricts an upper limit of a field current in Embodiment 1.

Next, FIG. 4 is a diagram for explaining a block configuration of an upper limit restriction unit which restricts an upper limit of the field current to the maximum field current at a set voltage in Embodiment 1. A charging voltage of the battery 8, for example, 14.0 V is inputted to a multiplier M2 as a predetermined set voltage VR. The set voltage VR is a voltage value capable of continuing energization even if the field current to the field coil 2 is on-duty 100%. A 100% duty value is further inputted to the multiplier M2 and 100VR % is outputted from the multiplier M2. The 100VR % is inputted to a divider D2; and as a further other input, the DC voltage VB of the rectifier 3 (or, DC voltage of the electric double layer capacitor 4) is inputted. 100VR %/VB, that is, the set voltage/the DC voltage is found by the divider D2 and is outputted. The output value is converted by an upper and lower limit clip circuit S2, and the on-duty of the switching element 11 is outputted as on-duty capable of continuing energization. The on-duty output is restricted to not higher than 100%.

An upper limit on-duty of the switching element 11 by the upper limit restriction unit is based on the set voltage/the DC voltage; and therefore, even if the DC voltage of the rectifier 3 becomes large, the upper limit of the field current can be restricted to the maximum field current at the set voltage. In the integrated selector 20, the upper limit on-duty of the switching element 11 found (by the upper limit restriction unit) based on the set voltage/the DC voltage and the on-duty of the switching element 11 by the power generation command are inputted to the minimum value selector Min7 and are compared, smaller on-duty thereof is outputted as actual on-duty, and ON/OFF control of the switching element 11 is performed via the drive circuit 21. In this way, for example, if the DC voltage is 28 V, the maximum on-duty becomes 0.5 (i.e., 14 V/28 V=0.5), and the average voltage to be applied to the field coil is restricted to an output voltage of 14 V (i.e., 28 V×0.5=14 V). Consequently, even when excessive on-duty is inputted by the power generation command, only the average voltage of 14 V is applied to the field coil; and therefore, burnout of the field coil and burnout of the generator due to excessive power generation can be prevented. Furthermore, a current sensor is not used and thus it becomes possible to achieve inexpensively; and time parameter that is on-duty is controlled and therefore good accuracy is achieved.

Figure 5:
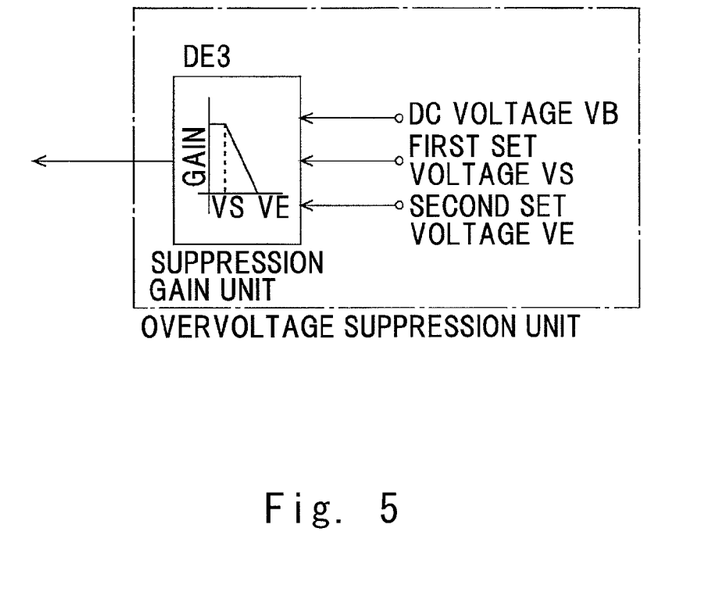
FIG. 5 is a diagram for explaining a block configuration of an overvoltage suppression unit which suppresses an over output voltage in Embodiment 1.

FIG. 5 is a diagram for explaining a block configuration of an overvoltage suppression unit which suppresses an over output voltage in Embodiment 1. The DC voltage VB is inputted to a suppression gain unit DE3; and as further other inputs, a first set voltage VS (overvoltage suppression start voltage, for example, 27.5 V) and a second set voltage VE (overvoltage suppression end voltage, for example, 28.5 V) are inputted. When the DC voltage VB starts to exceed the first set voltage VS, gain is suppressed; with a further rise of the DC voltage VB, the gain is further suppressed; and when the DC voltage VB reaches the second set voltage VE, the gain becomes zero. Then, the output of the suppression gain unit DE3, the output being 1, is continuously decreased from 1 (or gradually decreased) when the DC voltage VB starts to exceed the first set voltage VS; and the output of the suppression gain unit DE3 becomes zero when the DC voltage VB reaches the second set voltage VE. The upper limit on-duty that is the output of the upper limit restriction unit is multiplied by the output of the suppression gain unit DE3 with the multiplier M6 of the integrated selector 20; and accordingly, the on-duty can be reduced when the DC voltage VB is from the first set voltage VS to the second set voltage VE.

That is, when the electric load 7 is small, even in the case of restricted (the set voltage/the DC voltage) upper limit on-duty as described above, the electric double layer capacitor 4 is further charged and a power generation voltage rises. Ordinarily, the voltage of the electric double layer capacitor 4 is detected by an outside controller (ECU) which outputs the power generation command and the power generation command is controlled so that the power generation voltage does not exceed an allowable voltage (second set voltage VE) of the electric double layer capacitor 4. However, when the power generation command is further received even beyond the allowable voltage of the electric double layer capacitor 4 due to any defect, the suppression gain unit DE3 controls the on-duty to zero; and therefore, there are effects in that the field current is cut off, the generator does not generate power, the voltage rise of the electric double layer capacitor 4 is suppressed, and the electric double layer capacitor 4 is protected.

Figure 6:
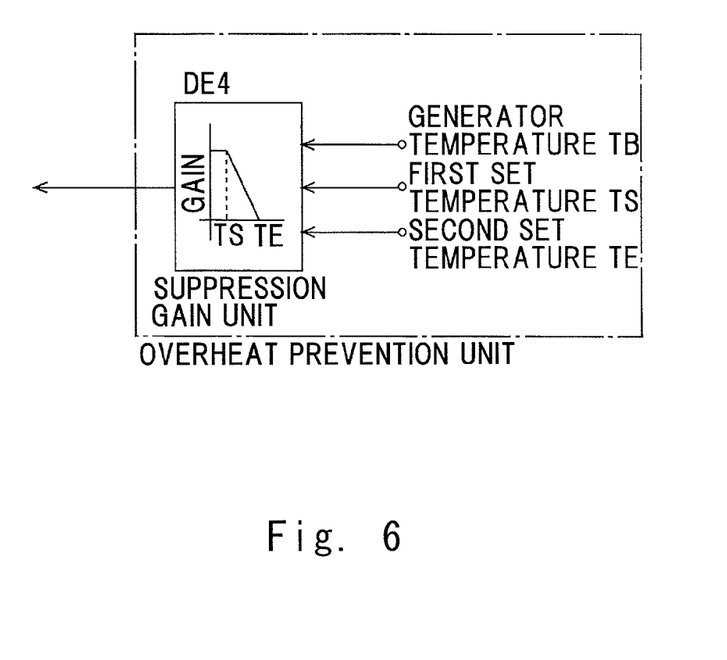
FIG. 6 is a diagram for explaining a block configuration of an overheat prevention unit which prevents overheat in Embodiment 1.

FIG. 6 is a diagram for explaining a block configuration of an overheat prevention unit which prevents overheat in Embodiment 1. A generator temperature TB of a temperature sensor (not shown in the drawing) of the generator is inputted to a suppression gain unit DE4. A first set temperature TS (temperature that starts the suppression of the output against overheat) and a second set temperature TE (temperature that makes the output zero against overheat limitation) are inputted to the suppression gain unit DE4 as further other inputs. When the generator temperature TB starts to exceed the first set temperature TS, gain is suppressed; with a further rise of the generator temperature TB, the gain is further suppressed; and when the generator temperature TB reaches the second set temperature TE, the gain becomes zero.

Then, the output of the suppression gain unit DE4, the output being 1, is continuously decreased from 1 (or gradually decreased) when the generator temperature TB starts to exceed the first set temperature TS; and the output of the suppression gain unit DE4 becomes zero when the generator temperature TB reaches the second set temperature TE. The upper limit on-duty that is the output of the upper limit restriction unit is multiplied by the output of the suppression gain unit DE4 with the multiplier M6 of the integrated selector 20; and accordingly, the on-duty can be reduced when the generator temperature TB is from the first set temperature TS to the second set temperature TE. The on-duty becomes zero when the generator temperature TB exceeds the second set temperature TE; and therefore, overheat of the generator can be prevented.

Figure 7:
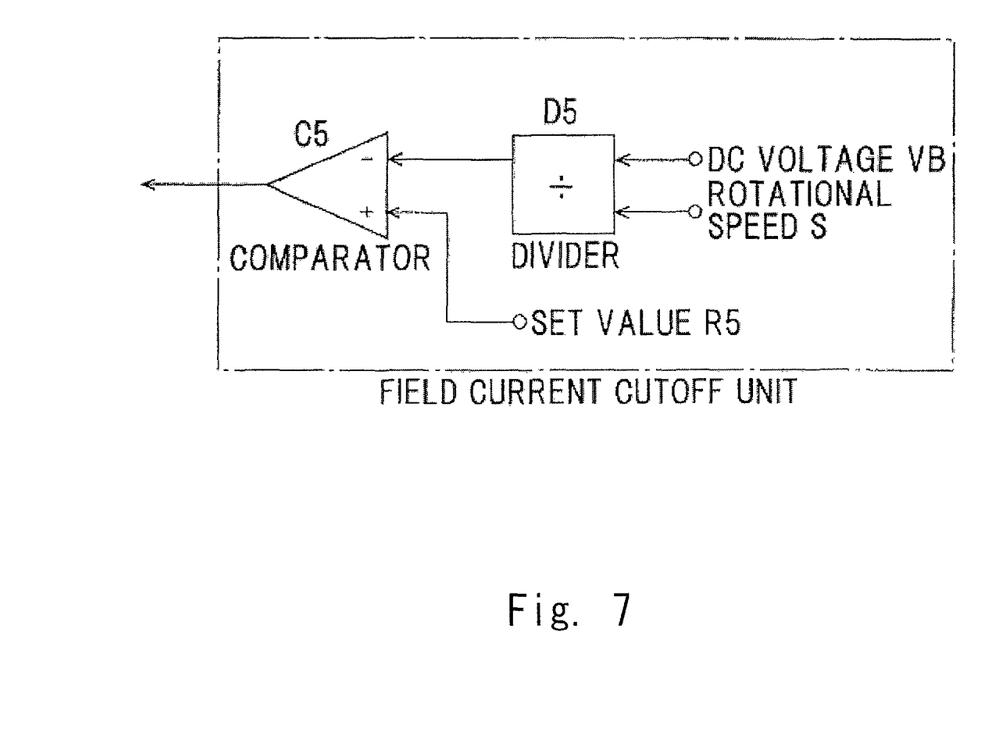
FIG. 7 is a diagram for explaining a block configuration of a field current cutoff unit which cuts off an unnecessary field current in Embodiment 1.

FIG. 7 is a diagram for explaining a block configuration of a field current cutoff unit which cuts off an unnecessary field current in Embodiment 1. The DC voltage VB of the rectifier 3 or the DC voltage VB of the electric double layer capacitor 4 is inputted to a divider D5. Rotational speed S of a rotational speed detector (not shown in the drawing) of the generator is further inputted to the divider D5. The DC voltage VB/the rotational speed S is found by the divider D5 and is inputted to an inversion input terminal of a comparator C5. A set value R5 is inputted to a reference input terminal of the comparator C5. When the DC voltage VB/the rotational speed S is not lower than the set value R5, the output of the comparator C5 becomes zero. The upper limit on-duty that is the output of the upper limit restriction unit is multiplied by the output of the comparator C5 with the multiplier M6 of the integrated selector 20; accordingly, the on-duty can become zero when the DC voltage VB/the rotational speed S is not lower than the set value R5; and therefore, the field current can be cut off.

In the generator, when the field current flows at the maximum level, voltage at which power can be generated is determined by rotational speed; and therefore, when the rotational speed is low, power cannot be generated even when the field current flows at the maximum level. Consequently, since the field current is used in vain even when the field current flows at the rotational speed at which power generation cannot be performed, the field current is cut off at that time; accordingly, loss can be reduced. More particularly, in the AC generator system in which the DC voltage is variable, power generation start rotational speed changes depending on the DC voltage of the electric double layer capacitor 4; and therefore, if parameter that is the DC voltage/the rotational speed is adopted, judgment can be made whether or not power generation can be performed by only comparing with the set value and thus the AC generator system can be simplified. In this case, the rotational speed detector of the generator may use one which can detect power generation frequency of the generator due to residual magnetic flux, or may use other unit which can estimate the rotational speed of the generator, such as engine rotational speed.

Figure 8:
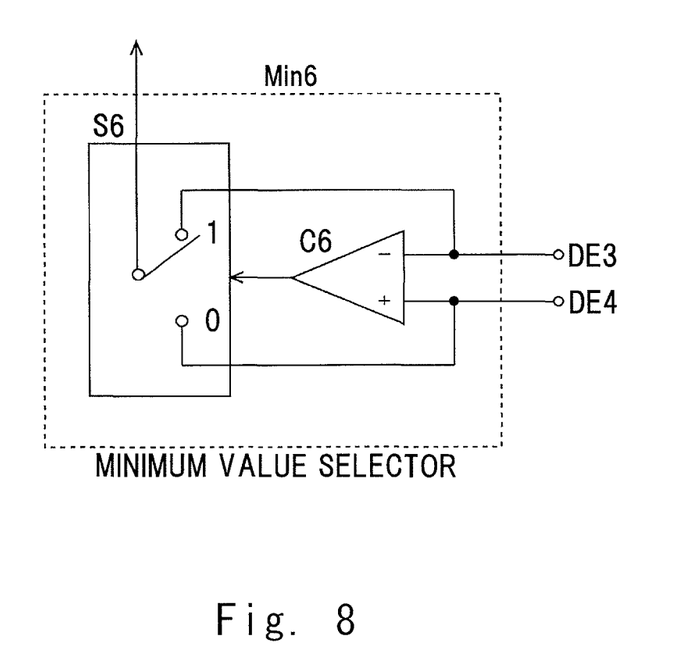
FIG. 8 is a diagram for explaining a block configuration of a minimum value selector in Embodiment 1.

Next, the operation of the integrated selector 20 shown in FIG. 2 will be described. The outputs of the overvoltage suppression unit (suppression gain unit DE3) and the overheat prevention unit (suppression gain unit DE4) are inputted to a minimum value selector Min6; smaller output of the outputs is selected; and this output is inputted to the multiplier M6. FIG. 8 is a diagram for explaining a block configuration of the minimum value selector in Embodiment 1. The output DE4 of the overheat prevention unit is inputted to a reference input terminal of a comparator C6; the output DE3 of the overvoltage suppression unit is inputted to an inversion input terminal of the comparator C6; and both inputs are compared by the comparator C6. When DE3 is smaller than DE4, "1" is outputted from the comparator C6; DE3 is selected by the selector S6; and DE3 is outputted from the minimum value selector Min6. On the other hand, when DE3 is larger than DE4, "0" is outputted from the comparator C6; DE4 is selected by the selector S6; and DE4 is outputted from the minimum value selector Min6. In doing so, smaller output of DE3 and DE4 is selected and is outputted from the minimum value selector Min6.

The outputs of the upper limit control unit (upper and lower limit clip circuit S2) and the field current cutoff unit (comparator C5) are further inputted to the multiplier M6. The inputted three inputs are multiplied by the multiplier M6 and output thereof is inputted to the minimum value selector Min7. The output of the power generation command input unit (divider D1) is further inputted to the minimum value selector Min7. Smaller output of two inputs is selected by the minimum value selector Min7 and is outputted to the drive circuit 21; and ON/OFF control of the switching element 11 is performed by on-duty output of the drive circuit 21. Therefore, the field current by the output selected by the field coil 2 can be flown. Incidentally, the minimum value selector Min7 can be configured similarly to the configuration of the minimum value selector Min6 (FIG. 8).

In addition, the block configuration of the control device for the vehicle AC generator explained in FIG. 2 can also be configured by software. Furthermore, the control device for the vehicle AC generator is incorporated in the AC generator system; accordingly, even if the power generation command from the ECU cannot receive a normal power generation command due to defects such as a disconnection fault, the upper limit of the field current can be restricted by the upper limit restriction unit, the overvoltage suppression unit, the overheat prevention unit, and the field current cutoff unit; and therefore, the generator can be protected from defects, such as overexcitation, overvoltage, overheat, and loss reduction.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A control device for a vehicle AC generator, in which a DC voltage, obtained by rectifying an AC output voltage of an armature coil in said AC generator that has said armature coil and a field coil with a rectifier, is applied to said field coil to obtain a field current, and the field current is controlled by ON/OFF control of a switching element connected in series to said field coil, the control device for the vehicle AC generator comprising an upper limit restriction unit in which an upper limit of on-duty of said switching element is set to a ratio: set voltage/DC voltage, wherein the set voltage is a voltage capable of continuing energization when the field current of the field coil is on-duty 100%, and wherein a resulting value is converted by an upper and lower limit clip circuit generating the on-duty of said switching element.

2. The control device for the vehicle AC generator according to claim 1, wherein on-duty of said switching element by a power generation command is compared to the upper limit on-duty of said switching element by said upper limit restriction unit, and ON/OFF control of said switching element is performed by smaller on-duty thereof.

3. The control device for the vehicle AC generator according to claim 2, wherein the on-duty of said switching element is controlled to be zero when the DC voltage obtained by rectifying the AC output voltage with said rectifier exceeds a second set voltage that is larger than the set voltage.

4. The control device for the vehicle AC generator according to claim 2, wherein the on-duty of said switching element is controlled to be zero when temperature of said AC generator is detected and the detected generator temperature exceeds a set temperature.

5. The control device for the vehicle AC generator according to claim 2, wherein the on-duty of said switching element is controlled to be zero when rotational speed of said AC generator is detected and the DC voltage/the rotational speed is not lower than a set value.

6. The control device for the vehicle AC generator according to claim 1, wherein the on-duty of said switching element is controlled to be zero when the DC voltage obtained by rectifying the AC output voltage with said rectifier exceeds a second set voltage that is larger than the set voltage.

7. The control device for the vehicle AC generator according to claim 1, wherein the on-duty of said switching element is controlled to be zero when temperature of said AC generator is detected and the detected generator temperature exceeds a set temperature.

8. The control device for the vehicle AC generator according to claim 1, wherein the on-duty of said switching element is controlled to be zero when rotational speed of said AC generator is detected and the DC voltage/the rotational speed is not lower than a set value.

9. The control device for the vehicle AC generator according to claim 1, further comprising an overvoltage suppression unit which compares the DC voltage with a first threshold value and suppresses gain in the DC voltage when the DC voltage exceeds the first threshold value and which compares the DC voltage with a second threshold value and sets the gain to zero when the DC voltage exceeds the second threshold.

10. The control device for the vehicle AC generator according to claim 9, further comprising a field current cutoff unit, which divides the DC voltage by a rotational speed and provides the result of the dividing to an comparator to compare with a set value.

11. The control device for the vehicle AC generator according to claim 10, further comprising a multiplier, which multiplies the output from the overvoltage suppression unit, the field current cutoff unit, and the upper limit restriction unit, the result from the multiplier determines ON/OFF control of said switching element.

* * * * *